Patented Feb. 12, 1929.

1,702,188

UNITED STATES PATENT OFFICE.

HOYLANDE DENUNE YOUNG, OF CHICAGO, ILLINOIS, ASSIGNOR TO VAN SCHAACK BROS. CHEMICAL WORKS, INC., OF CHICAGO, ILLINOIS, A CORPORATION OF ILLINOIS.

ESTERS OF HEXYL ALCOHOL.

No Drawing.   Application filed January 9, 1928. Serial No. 245,626.

My invention relates to an ester of phthalic acid with hexyl alcohol and particularly to the ester of ortho-phthalic acid with methyl-isobutyl carbinol. Examples of my invention are tabulated below.

Methyl-isobutyl-methyl phthalate $C_6H_4[COO.CH(CH_3).CH_2.CH(CH_3)_2]_2$

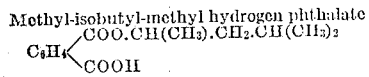
Methyl-isobutyl-methyl hydrogen phthalate
$C_6H_4\begin{cases} COO.CH(CH_3).CH_2.CH(CH_3)_2 \\ COOH \end{cases}$

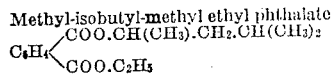
Methyl-isobutyl-methyl ethyl phthalate
$C_6H_4\begin{cases} COO.CH(CH_3).CH_2.CH(CH_3)_2 \\ COO.C_2H_5 \end{cases}$

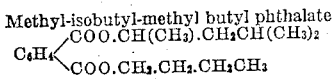
Methyl-isobutyl-methyl butyl phthalate
$C_6H_4\begin{cases} COO.CH(CH_3).CH_2.CH(CH_3)_2 \\ COO.CH_2.CH_2.CH_2CH_3 \end{cases}$

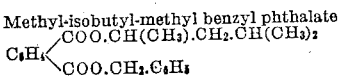
Methyl-isobutyl-methyl benzyl phthalate
$C_6H_4\begin{cases} COO.CH(CH_3).CH_2.CH(CH_3)_2 \\ COO.CH_2.C_6H_5 \end{cases}$ In the above formulas, the ethyl radical may be replaced by another aliphatic radical as, for example, isopropyl, isoamyl, or n-amyl, and the benzyl radical may be replaced by another aryl radical, as, for example, phenyl or cyclohexyl. Also; I may use another aromatic acid than ortho-phthalic to give other esters of methyl-isobutyl carbinol as, for example, the terephthalate, benzoate, salicylate, or phenyl-acetate of methyl-isobutyl carbinol.

A specific example of my invention is methyl-isobutyl-methyl ortho-phthalate. This substance may be represented by the structural formula

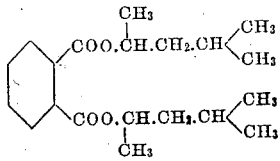

Methyl-isobutyl-methyl phthalate is a solvent for pyroxylin and a viscous, colorless liquid that boils at 170° C. at a pressure equal to approximately 4 mm. of mercury.

Methyl-isobutyl-methyl phthalate may be prepared as follows:

148 parts by weight of phthalic anhydride are heated with 204 parts of methyl-isobutyl carbinol, 0.7 parts of sulfuric acid, and 40 parts of benzol, in an apparatus so arranged that a mixture of benzene with the water from the esterification will distill through a refluxing column to a condenser. The distillate separates into two layers. The lower or water layer is drawn off through a valve and the benzene layer returned to the reaction vessel. After the mixture has been heated for 9 hours, the product may be cooled, washed until neutral with a dilute solution of sodium carbonate, then twice with water, and dried with anhydrous sodium sulfate. The benzene may be removed by distillation at a pressure of 35 mm. and the residue fractionated at a pressure equal to 4 mm. of mercury. The methyl-isobutyl-methyl phthalate distils at 170° C. at approximately 4 mm. pressure.

The other esters disclosed above may be made in a similar manner. One equivalent weight of the aromatic acid whose radical it is desired to have in the finished ester is esterified by heating in the presence of an equivalent amount of the alcohol or alcohols whose radicals are wanted also in the finished ester. A trace of sulfuric acid, as, for example, 0.1% to 0.5% of the weight of the aromatic acid, is added as a catalyst and the temperature of the mixture is maintained at such a point above 100° C. that the water formed in the reaction is removed by volatilization. Any alcohol that condenses as an oil layer on top of the thus distilled water is returned to the reaction mixture. In case a volatile, water-soluble alcohol, such as ethanol or iso-propanol, is one of the ingredients of the reaction mixture, the water distilled from the mixture may be fractionated and the recovered alcohol then returned to the reaction mixture. After nearly all, say 80% or more, of the aromatic acid has been esterified, the mixture is cooled, neutralized by shaking thoroughly with several portions of a solution of sodium carbonate in water, washed with a small amount of water, fractionated to remove the easily volatile materials, such as water and alcohol or alcohols that may be present, and then distilled at 2 to 4 mm. pressure. The main fraction of material that distills in vacuo at a constant temperature is accepted as the desired ester. It is further identified by analysis, as, by determining free acidity, specific gravity, saponification number, and saponifying to give the sodium salt of the acid present as well as the free alcohol or alcohols originally combined in the ester, and then identifying separately the several ingredients formed by the saponification.

Mixed esters, that is an ester containing a divalent or polyvalent aromatic acid group joined to more than one kind of alcohol radical, may be made as illustrated in the following example. Two equivalent weights of the aromatic acid, as, for example, ortho-phthalic acid, is mixed with one equivalent weight of methyl-isobutyl carbinol and 0.1% to 0.5% of sulfuric acid on the weight of the aromatic acid. The mixture is then warmed, preferably to above 100° C., and maintained at an elevated temperature until titration shows that substantially half of the acidity of the phthalic anhydride has been neutralized. This indicates that the reaction has progressed to the stage represented by the compound

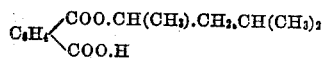

One equivalent weight of the other alcohol whose radical also it is desired to have in the finished ester, as, for example, normal-amyl alcohol, is then added. Boiling is begun and continued, as indicated above, with the elimination of water, until nearly all of the organic acid is esterified. This is then followed by neutralizing, washing, distilling, and analyzing as indicated previously.

The neutral methyl-isobutyl-methyl esters of aromatic acids containing not more than 9 carbon atoms to the molecule of acid and the mixed esters of those acids with methyl-isobutyl carbinol and another alcohol whose radical contains only carbon and hydrogen atoms and not more than 7 carbon atoms are solvents in the liquid state for pyroxylin. As such they are useful in pyroxylin compositions.

I claim:

1. A composition of matter comprising an ester of an aromatic acid with methyl-isobutyl carbinol.

2. A composition of matter comprising an ester of a dibasic aromatic acid with methyl-isobutyl carbinol.

3. A composition of matter comprising an ester of a phthalic acid with methyl-isobutyl carbinol.

4. A composition of matter comprising an ester of ortho-phthalic acid with methyl-isobutyl carbinol.

5. Dihexyl phthalate of the formula:

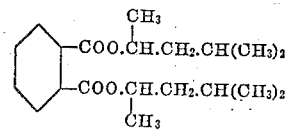

6. A composition of matter comprising the following grouping of atoms:

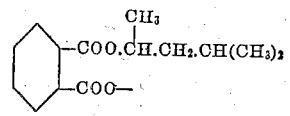

7. A composition of matter that may be represented by the following formula:

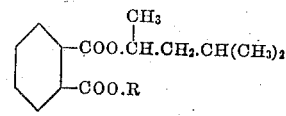

in which R represents a monovalent radical.

8. A composition of matter that may be represented by the following formula:

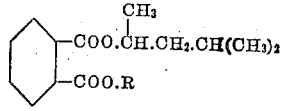

in which R represents a hydrocarbon radical.

9. A composition of matter that may be represented by the following formula:

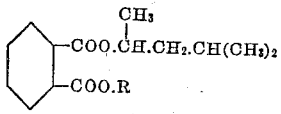

in which R represents an alkyl group.

HOYLANDE DENUNE YOUNG.